Figure 1:
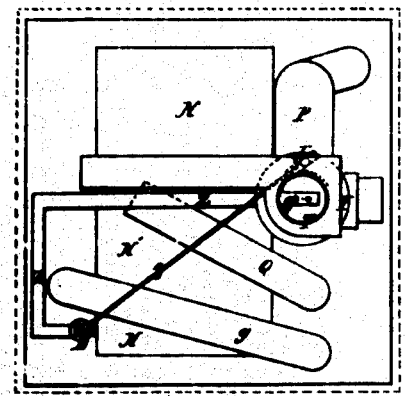

S. Clegg.
Gas Meter.
Nº 942. Patented Sept. 22, 1838

Witnesses:

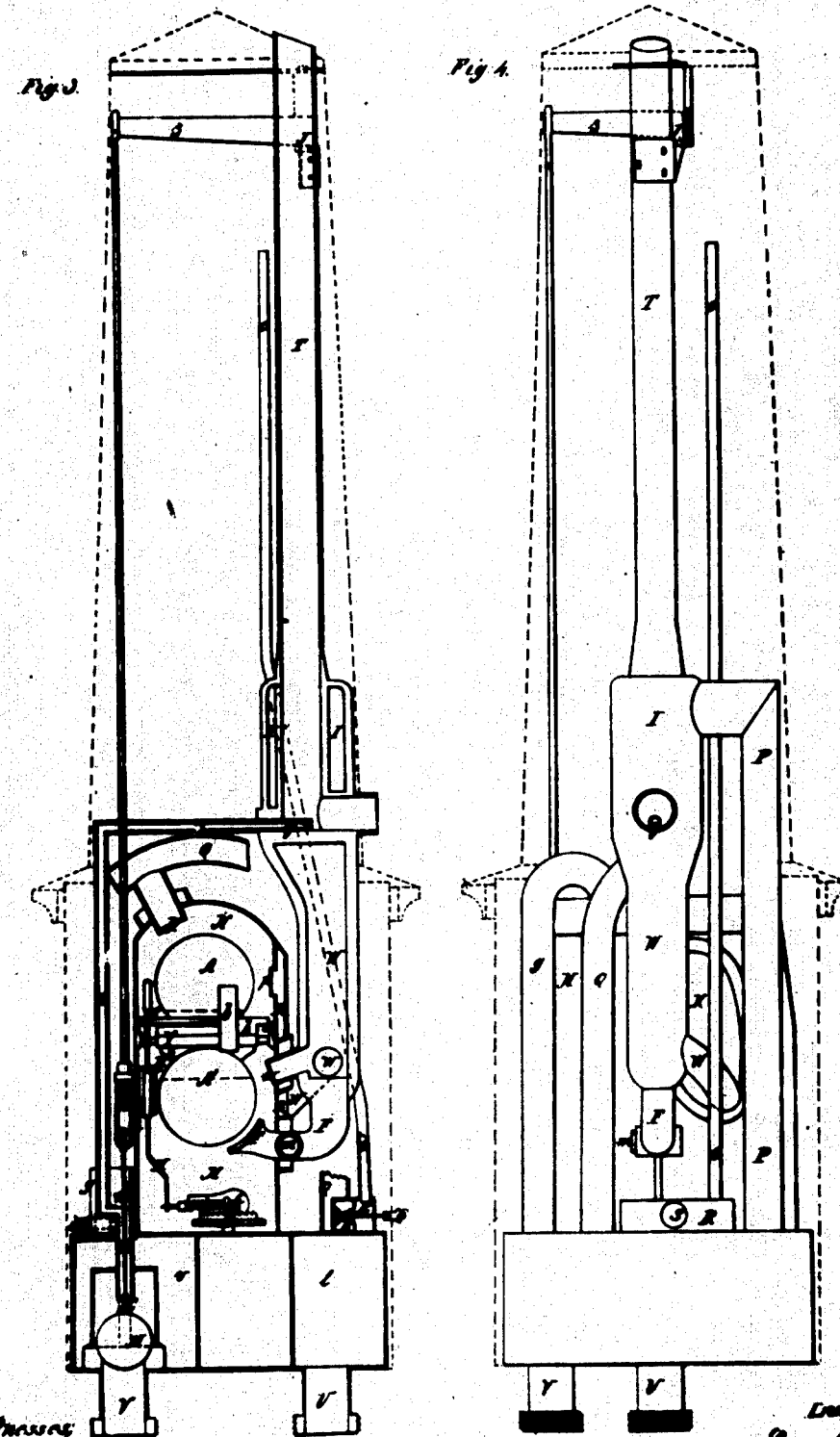

S. Clegg.
Gas Meter.
Nº 942.  Patented Sept. 22, 1838.
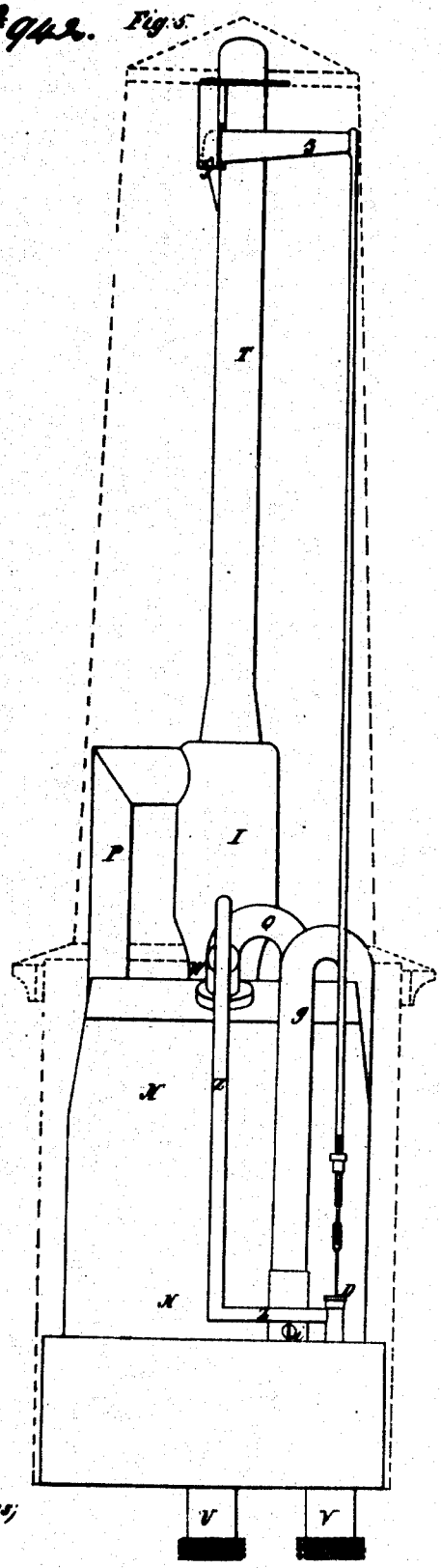

UNITED STATES PATENT OFFICE.

SAMUEL CLEGG, OF SIDMOUTH STREET, GRAY'S INN LANE, COUNTY OF MIDDLESEX, ENGLAND.

IMPROVED GAS-METER.

Specification forming part of Letters Patent No. 942, dated September 22, 1838.

*To all whom it may concern:*

Be it known that I, SAMUEL CLEGG, of Sidmouth Street, Gray's Inn Lane, in the county of Middlesex, in the Kingdom of Great Britain, engineer, have invented new and useful Improvements in Gas-Meters; and I hereby declare the nature of my invention to be as follows.

My improvements apply to that description of gas-meters known by the name of "dry gas-meters," acting without water or elastic membrane.

The principle of this gas-meter in the state of perfection to which I have now brought it consists in the application of heat (produced either by the flame of a gaslight or by any other convenient means) to certain pipes or chambers in which the gas circulates before it arrives at the interior of the meter, which causes the meter to commence working very soon after it is lighted. The gas thus heated blows through two apertures on two very thin glass globes, united by a bent glass tube and half filled with alcohol or any other fluid which boils at a low temperature, the remainder of their capacity forming a vacuum. The tube which unites the globes forms with them a balance which rests on an axis in such a manner as to be able to oscillate freely, as hereinafter described. A counter-weight projecting from the axis serves to keep the two globes in nearly a vertical position one above the other. A third current of gas, not heated or very slightly heated, as I shall describe hereinafter, is blown upon the upper globe, which renders unequal the temperature of the two globes and thus causes the alcohol contained in the lower globe to rise into the upper, and by rendering the upper globe the heaviest causes the balance to turn over and changes the position of the two globes. The lightest is thus brought opposite the current of cold gas, while the heaviest is exposed to a current of hot gas, only this reproduces the effect already described, and by causing the balance to turn back again restores the globes to their former position. Their action is thus constantly kept up at a speed proportioned to the quantity of gas which is blown upon the globes, and a fourth current of gas passes the meter without in any way acting on the globes, the object of which is to render the meter capable of measuring a larger quantity of gas and also to adjust its speed. The number of oscillations of the balance is registered on figured dials by means of a train of wheel-work, indicating thereon the quantity of gas that has passed through the meter.

Description of the parts.

In all the figures of the drawings hereunto annexed, which are the full size of a five-light meter, the same letters indicate the same parts.

The gas for putting the meter in action requiring to be heated, I have devised two methods to effect this object, the principal difference of which is that in the one a special flame gives the heat required, while in the other the flame of one of the lights employed by the consumer is used for that purpose. This difference renders some modification necessary in the construction of the various parts, which I shall describe hereinafter.

First method.

Figure 2:
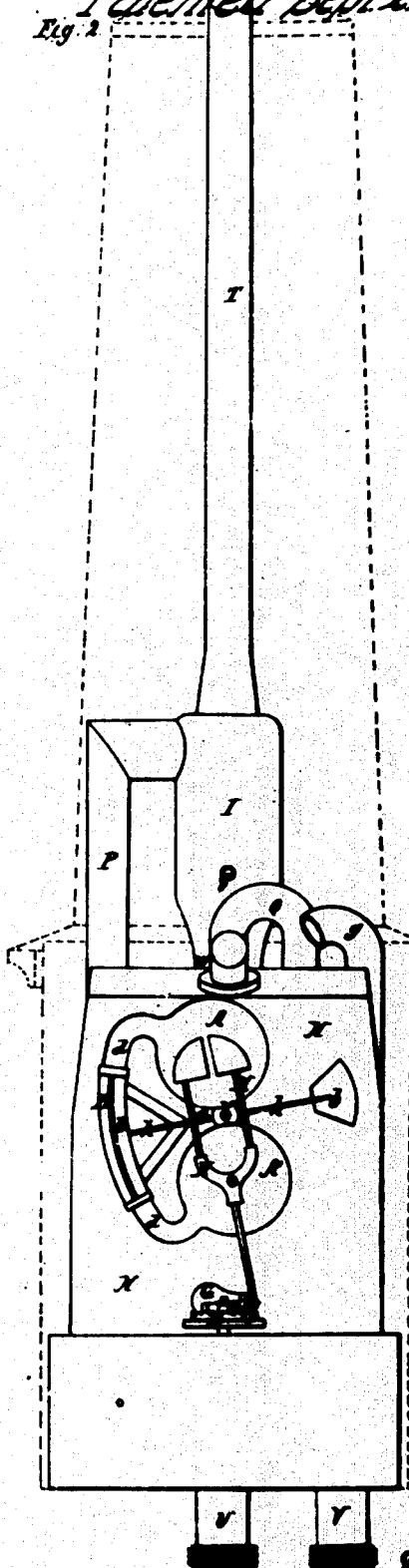

Figure 1 is a horizontal plan of the improved gas-meter; Fig. 3, a vertical section; Fig. 2, an elevation with one side removed to show the interior; Fig. 4, an elevation showing the opposite side to Fig. 2; Fig. 5, the same view as Fig. 2, with the side of the meter complete; Fig. 6, a section of the heating-chamber, chimney, and thick metal pipe cut the opposite way to Fig. 3.

A A' represent two glass globes of the balance. The glass tube $d$, which unites them, is bent as shown in Fig. 3.

Y is a horizontal axis of the balance.

The globes A A' are firmly attached to the axis in the following manner: A tin plate, $h$, is soldered to the axis Y. On this plate in like manner is soldered a half-pipe of tin, B, which receives the tube $d$. A second half-pipe B surrounds the back part of tube $d$, and two rings soldered to their extremities serve to unite the two half-pipes B B. The two globes A A' are thus kept at an equal distance from the axis Y, which turns in bearings soldered to the sides of the chamber N N, which contains the balance A A' $d$ Y $h$. This chamber is made of tin and closely soldered in all parts.

*b* is a counter-weight projecting from the plate A and serving to keep the globes in nearly a vertical position.

U is an inlet-pipe for the gas.

V is an exit-pipe leading to the burners.

M is a valve for opening and shutting the communication of the meter with the outlet-pipe V.

Z Z represent a pipe having a governor or regulating-cone C at its extremity and surmounted by a small pipe, *q*. This last is pierced with two small burner-holes for the passage of the gas, which, being lighted, gives the requisite heat for setting the meter in action.

P is a pipe conducting the gas to a chamber, I.

I is a chamber made of thick metal, to which the pipes P W are joined.

W is a thick metal pipe, through which the gas passes after having been heated in the chamber I.

F is a solid metal conductor for transmitting heat to the lower part of the chamber N, terminating in the form of a spoon corresponding in its curve with the lower globe, but which it does not touch.

*m* is a screw for regulating the heat of the conductor F.

Q is a pipe for conducting the cold gas.

*k* is an aperture at which the cold gas blows upon the upper globe.

*w* is an opening for the hot gas to blow on the lower globe.

T is a vertical chimney brazed to the top of the chamber I, the upper part of which chimney supports a lever, Z, at the point J. The short end of this lever is attached to the outer case and the long end to a wire which passes through a stuffing-box, D, and suspends the valve M and the governor or regultating-cone C.

K is an ante-chamber for the hot gas, which blows upon the upper globe by the orifice *p*.

*a* is a small arm projecting from the plate *h* and serving to transmit the motion of this plate to the forked lever H. This lever moves on an axis fixed to the side of the chamber N and acts at its lowest extremity on a catch which gives motion to the ratchet-wheel L. A second catch falls into the small teeth of the wheel L and prevents any retrograde movement. A small steel spring fixed to the plate *h* strikes against the stops *e e*, fixed to the sides of the chamber N. This limits the distance the balance can move and keeps the globes A A' in a proper position for the next oscillation, as seen at Fig. 3.

*g* is a pipe connecting the chambers *l v* and containing a regulating-screw, *i*, which closes the end of the pipe and serves to regulate the quantity of gas which passes through it. This I call the "neutral pipe."

*l* is an inlet-chamber connecting the pipe U with the pipes Q, P, and *g*.

*v* is an outlet-chamber through which the gas passes in its way to the burners.

R is a small box divided into two compartments, which communicate with each other by a valve, E, in the division. This valve is kept closely shut by a spring. The compartment behind the valve is open to the meter, and to the other compartment the pipe O is attached.

*Operation.*

To put the improved meter in action, the valve E must be opened by pressing the small brass stud S, which projects beyond the outer case. This will allow the atmospheric air which may have accumulated in the meter or pipes to escape at the pipe O, and the burner *q* can then be lighted, which heats the chamber I and the gas contained therein; but no gas can pass the meter before the valve M is opened. This is effected as follows: The chimney T, receiving the heat of the flame *q*, expands and raises the lever *z*, which draws the wire and raises the valve M and the governor C. When there is sufficient heat to work the meter, this governor closes the aperture conducting to the burner and diminishes the flame. Should the heat become less, the chimney will contract and allow the governor to descend, thereby enlarging the aperture at the end of the pipe Z Z and increasing the heat of the flame, thus regulating the size of the flame, whatever variation may occur in the pressure of gas which supplies it. The valve M being opened, the gas passes through the pipes P, Q, and *g*. The current of gas passing up the pipe P gets into the chamber I, where it is heated, and then descends by the pipe W till it arrives at the orifice *w*. There a portion escapes and blows upon the globe A', and the rest of the gas, following the direction of the pipe W, enters the lower part of the ante-chamber K, in which it rises, and escapes in a jet at *p* upon the upper globe, A. The gas blowing through the orifice *w* is rather hotter than that blowing through *p*. This is caused by the gas which escapes at the opening *w* having traversed a less distance since it left the chamber I. This difference of temperature in these two jets of gas slightly disposes the alcohol contained in the globe A' to rise into the globe A, and counteracts the opposite effect caused by the hottest portion of the gas contained in the chamber N N rising to the top, and thereby giving an excess of heat to the upper globe. An equal quantity of heat is thus given to both globes. The current of cold gas which rises in the pipe Q blows through an opening, *k*, upon the globe A, to cool and partially condense the vapor contained therein, and consequently makes the alcohol rise from the globe A' to A until the latter becomes the heaviest and turns over the balance. The position of the two globes is thus reversed, and the currents of gas, acting in the same way, again cause the balance to overturn and restore the two globes to their former position. These alternate movements continue with a speed proportioned to the quantity of gas which enters by the openings *k*, *p*, and *w*. The small stops *e e* prevent the balance from assuming a completely vertical position, and by this means render its action certain when the alcohol has risen into the upper globe. A fourth current of gas passes by the opening g into the chamber v. This current of gas, which I call "neutral" gas, passes through the meter without blowing upon the globes, and its object is to render the meter applicable to a larger number of lights, and to regulate its action, which is effected by increasing or diminishing the opening of the pipe g by the regulating-screw i or by any other convenient means. The solid conductor F transmits a certain quantity of heat from the chamber I to the lower globe, which compensates for the heat transmitted to the upper part of the chamber N, and consequently to the upper globe, A. The alternate movements of the balance are transmitted to the registering-dials by means of an arm, a, which acts on the forked lever H and sets in action the catch G, which gives motion to the wheel L, and thence (in the method now in common use) by a train of wheel-work to the hands on the dials, to register the quantity of gas that has passed through the meter.

Second method.

Fig. 7.—In this system the pipes P and W and the solid conductor F are soldered to an Argand burner made of thick metal and containing a chamber, I, at its lower extremity to heat the gas. This is separated from the chamber r and the burner by a partition, s. The heat of the flame is communicated to the chamber I, in which the gas is heated by the conductibility of the metal of which the chamber and burner are formed, and also to the conductor F, in the manner described by the former method. The small pipe t, provided with a regulating-screw, supplies the chamber r and the burner with gas furnished from the chamber N, passing through the chamber I, with which, however, it has no communication. Although I have said that an Argand burner can be employed in this system, that which I have represented in the drawings, and which I am about to describe, presents improvements in this description of burner.

y y is an annular cavity, communicating with the chamber v by two branches, x. This cavity is pierced with holes at the top in the same way as ordinary burners, except that the surface in which the holes are pierced forms a portion of a cone, instead of being a level surface. A ring projects above the holes from the inner edge, in order to preserve them from dust or dirt. A ring or cap, j, covers the burner and is rather larger at its upper end than at the top of the ring above mentioned, and consequently leaves an annular space, q' q', by which the gas to be lighted passes out. All the other parts for this method are similar to those of the former one. It will therefore be useless to repeat the description of them.

All meters constructed on either of these systems are surrounded by a case of metal or any other convenient material, as shown by the dotted lines in all the figures, the form of which may be varied according to the taste of the manufacturer, having small apertures for the external air to circulate through it.

The description and drawings hereto annexed represent a meter for five lights. This meter can be made to measure gas for more than that number of lights by increasing proportionably the size of the globes and the dimensions of the other parts; also by increasing the number of apertures through which the gas blows upon the globe, or, as before mentioned, by increasing the size of the neutral pipe g. In making meters for a very large number of lights two or several balances may be used, each similar to those above described, and rendered uniform in their action by wheel-work or otherwise. In this case the number of jets of cold and hot gas should be increased in the same proportion.

Now that I have described a meter for measuring the gas consumed by five or a larger number of lights and have furnished drawings giving an exact representation of it, I wish it to be clearly understood that I do not mean to restrict myself to the precise form of the different parts as described herein; but

I claim exclusively—

The instrument or combination above described for measuring gas, composed of one or more balances formed of one pair or several pairs of globular or other shaped vessels, each pair being united by a tube and partly filled with alcohol or any other fluid which boils at a low temperature and submitted to the action of jets of gas at different temperatures, this gas being heated before it arrives at the vessel containing the said balances by a flame of gas or any other convenient means.

SAMUEL CLEGG.

Witnesses:
 WALT. HUGHES,
  *Solicitor, 144 Leadenhall Street, London.*
 WM. JAS. SKINNER,
*Clerk to Messrs. Kearsey, Hughes & Thomas, 144 Leadenhall Street.*